US006972404B2

(12) United States Patent
Lu

(10) Patent No.: US 6,972,404 B2
(45) Date of Patent: Dec. 6, 2005

(54) OPTICAL CONTROL DEVICE HAVING A CONTROLLER THAT CONTROLS TRACK MOVEMENT OF A DRIVEN MEMBER THROUGH A DRIVE UNIT WITH REFLECTING REGIONS

(75) Inventor: Chung-Chi Lu, Taipei (TW)

(73) Assignee: Matsushita Electric (Taiwan) Co., Ltd., Chung-Ho (TW)

( * ) Notice: Subject to any disclaimer, the term of this patent is extended or adjusted under 35 U.S.C. 154(b) by 434 days.

(21) Appl. No.: 10/280,437

(22) Filed: Oct. 25, 2002

(65) Prior Publication Data

US 2004/0079869 A1 Apr. 29, 2004

(51) Int. Cl.[7] .............................................. G01D 5/34
(52) U.S. Cl. ..................................... 250/231.15; 341/2
(58) Field of Search ..................... 250/231.13–231.18; 341/2, 9

(56) References Cited

U.S. PATENT DOCUMENTS 6,685,370 B2 * 2/2004 Hiramatsu .................. 400/640

* cited by examiner

Primary Examiner—Thanh X. Luu
(74) Attorney, Agent, or Firm—Christie, Parker and Hale, LLP

(57) ABSTRACT

An optical control device includes a drive member formed with a plurality of reflecting regions along a second track and movable along the second track for driving a driven member to move along a first track. An optical unit emits a light beam that is incident upon an aligned reflecting region, and receives a light beam that was reflected by the aligned reflecting region to generate an electrical output. A controller determines actual positions of the drive member on the second track and the driven member on the first track, and controls the drive member to move along the second track so as to dispose the driven member at a desired position on the first track.

5 Claims, 6 Drawing Sheets

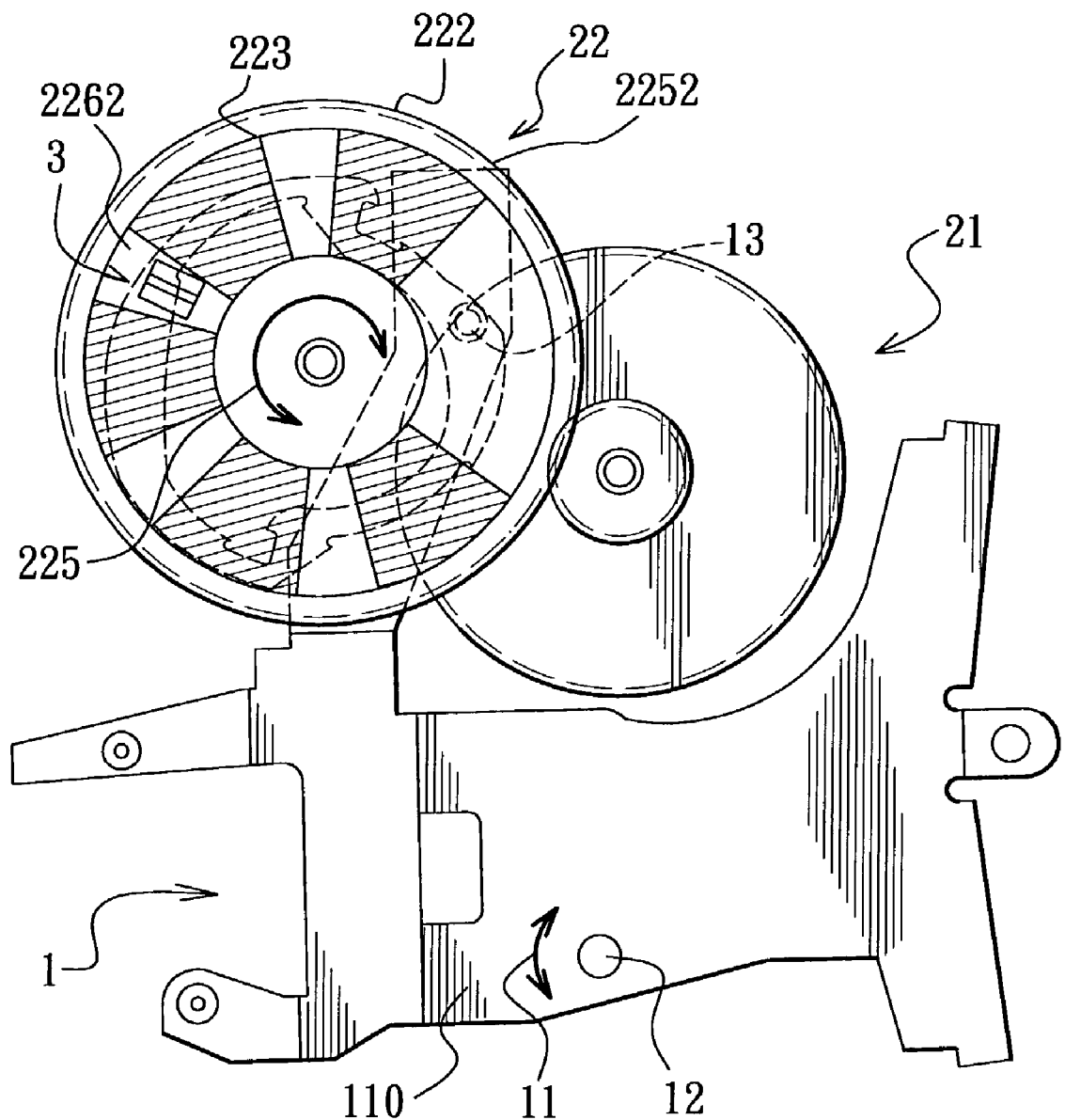
F I G. 6

OPTICAL CONTROL DEVICE HAVING A CONTROLLER THAT CONTROLS TRACK MOVEMENT OF A DRIVEN MEMBER THROUGH A DRIVE UNIT WITH REFLECTING REGIONS

BACKGROUND OF THE INVENTION

1. Field of the Invention

This invention relates to an optical control device, more particularly to an optical control device for controlling movement of a driven member along a determined track.

2. Description of the Related Art

A conventional magnetic clutch mechanism for controlling movement of a driven member, such as for controlling forward, rewind and stop operations of a tape recorder, generally includes a magnetic coil to attract or repulse a push rod so as to drive movement of the driven member through a cam mechanism. A biasing member is disposed to bias the push rod back to its original position. The conventional magnetic clutch mechanism is complicated and bulky in structure. There is also a need to assemble the magnetic clutch mechanism precisely to ensure stability within a wide range of operating conditions, thereby resulting in inconvenient assembling.

SUMMARY OF THE INVENTION

The object of the present invention is to provide an optical control device which has a simple and compact construction and which can control movement of a driven member precisely.

According to this invention, the optical control device includes a drive unit, an optical unit and a controller. The drive unit includes a drive member which is disposed to be movable along a second track and which is adapted to be coupled to a driven member for driving the driven member to move along a first track. The drive member has a surface formed with a plurality of reflecting regions which are disposed along the second track and which have different light reflecting responses to a same light signal. The optical unit is disposed adjacent to the drive member, and includes a light emitter for emitting a light beam that is incident upon an aligned one of the reflecting regions on the surface of the drive member during movement of the drive member along the second track, and a light receiver for receiving a light beam that was reflected by the aligned one of the reflecting regions on the surface of the drive member. The light receiver generates an electrical output corresponding to the light beam received thereby. The controller is coupled electrically to the optical unit and the drive unit. The controller determines actual position of the drive member on the second track according to the electrical output of the light receiver, and further determines actual position of the driven member on the first track according to the actual position of the drive member on the second track. The controller is adapted to receive a control input corresponding to a desired position of the driven member on the first track, and controls the drive unit in response to the control input for moving the drive member along the second track so as to dispose the driven member at the desired position on the first track.

BRIEF DESCRIPTION OF THE DRAWINGS

Other features and advantages of the present invention will become apparent in the following detailed description of the preferred embodiment of the invention, with reference to the accompanying drawings, in which:

FIG. 6 is a view similar to FIG. 4, showing a driven member when moved to a desired position.

DETAILED DESCRIPTION OF THE PREFERRED EMBODIMENT

Figure 1:
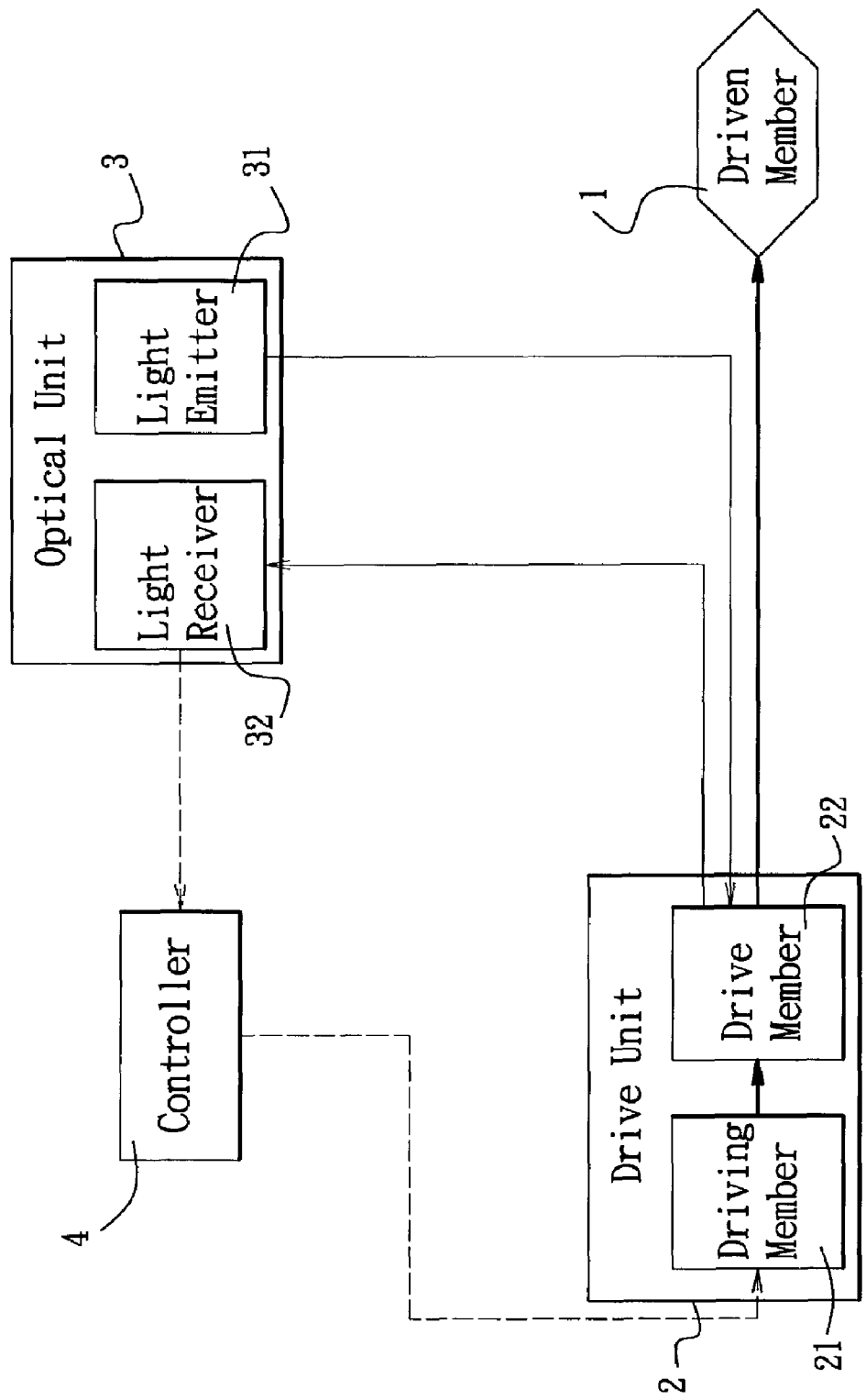
FIG. 1 is a schematic block diagram of a preferred embodiment of an optical control device according to this invention.
Figure 2:
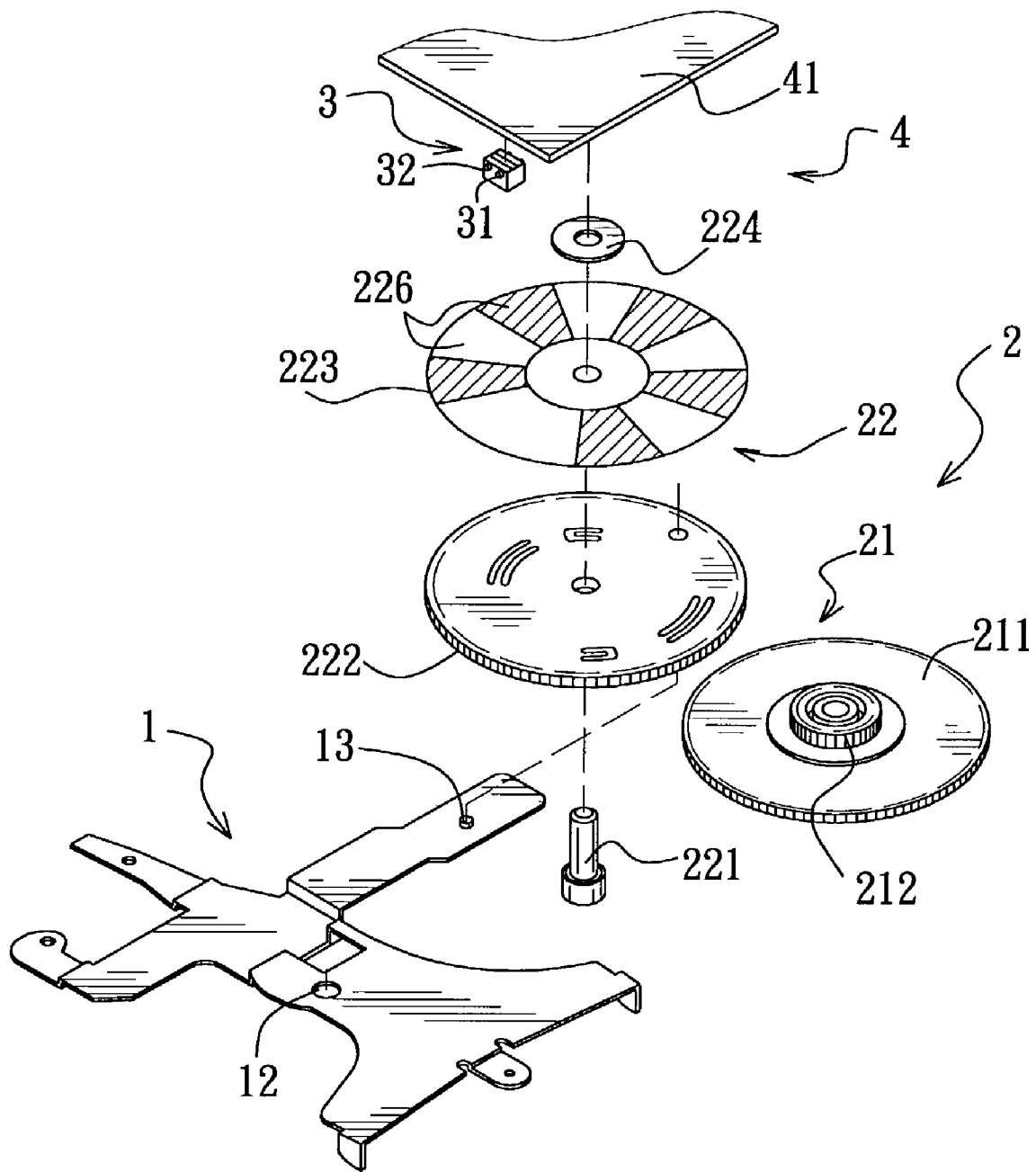
FIG. 2 is a fragmentary exploded perspective view of the preferred embodiment.

Referring to FIGS. 1 to 5, the preferred embodiment of the optical control device according to the present invention is shown to be adapted to control movement of a driven member 1, which is a metal flat plate in this embodiment. The driven member 1 has a pivot hole 12 for pivoting on a base plane 5 using a pivot pin 14 so as to be movable relative to the pivot pin 14 along a curved first track centered at the pivot pin 14 (as indicated by arrows 11 in FIG. 4).

The optical control device according to this embodiment is shown to comprise a drive unit 2, an optical unit 3, and a controller 4.

The drive unit 2 includes a driving member 21 and a drive member 22. The driving member 21 includes a motor (not shown), a gear wheel 211 which is pivoted to the plane 5 and which is driven to rotate by the motor, and a pinion 212 which rotates coaxially with the gear wheel 211. The drive member 22 includes a rotating axle 221, a gear wheel 222 which is pivoted to the base plane 5 by the axle 221, and a circular thin plate 223 which is secured on the gear wheel 222 by means of a fastening ring 224. The gear wheel 222 meshes with the pinion 212 so as to be driven by the pinion 212 to rotate about the axle 221. Thus, the circular thin plate 223 is movable by virtue of the rotation of the gear wheel 222 along a second track (as indicated by arrows 225 in FIG. 4), i.e. a circular track, that is centered at the axle 221. The circular thin plate 223 has a first surface which is formed with a plurality of reflecting regions 226 that respectively extend in radial directions from the center of the second track 225 and that are disposed along the second track 225. The reflecting regions 226 include dark-colored and light-colored reflecting regions, such as black and white regions, which are alternately and angularly disposed on the second track 225 and which have different radial widths so as to have different light reflecting responses to a same light signal.

Figure 3:
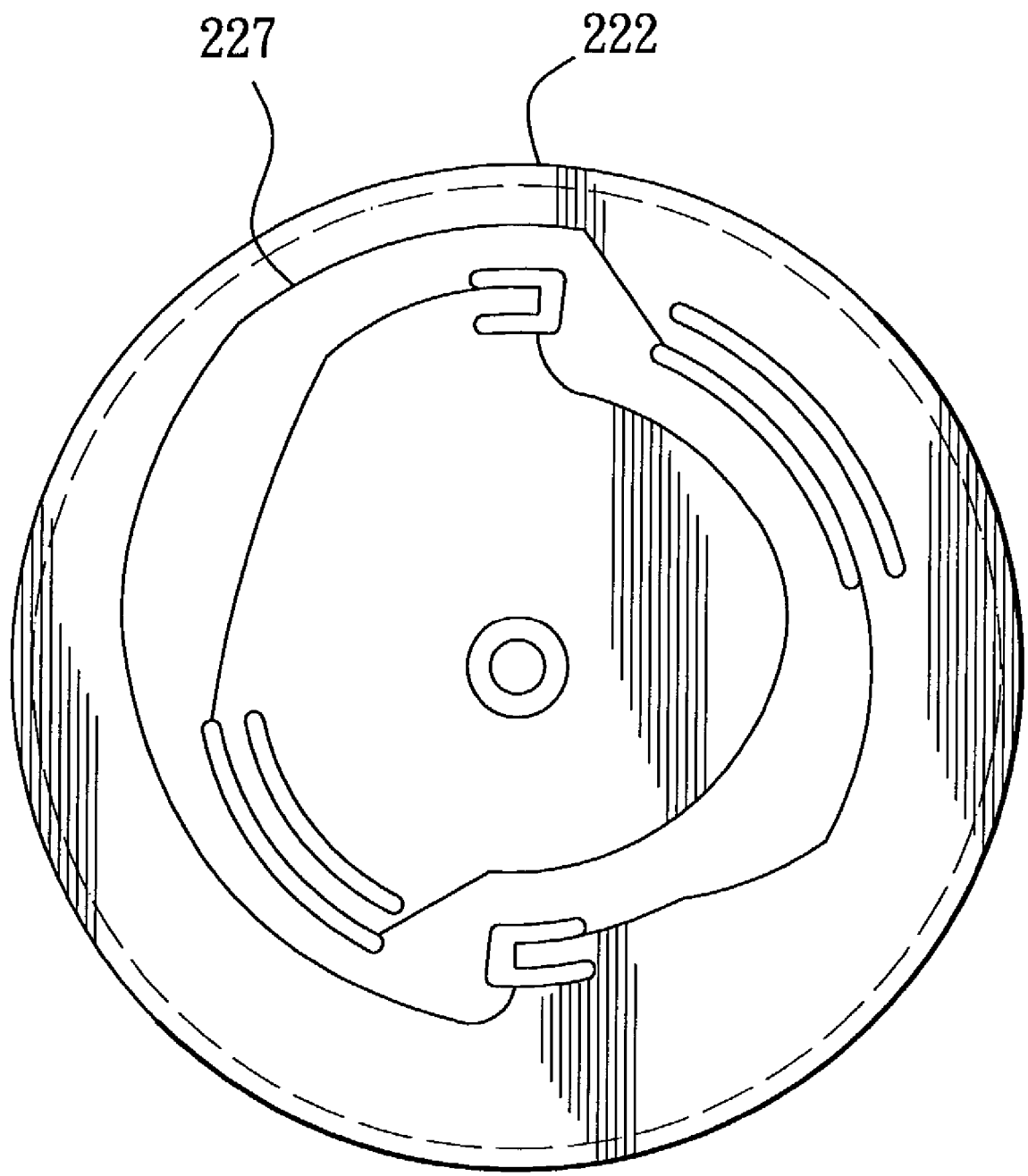
FIG. 3 is a bottom view of a drive member of the preferred embodiment.
Figure 4:
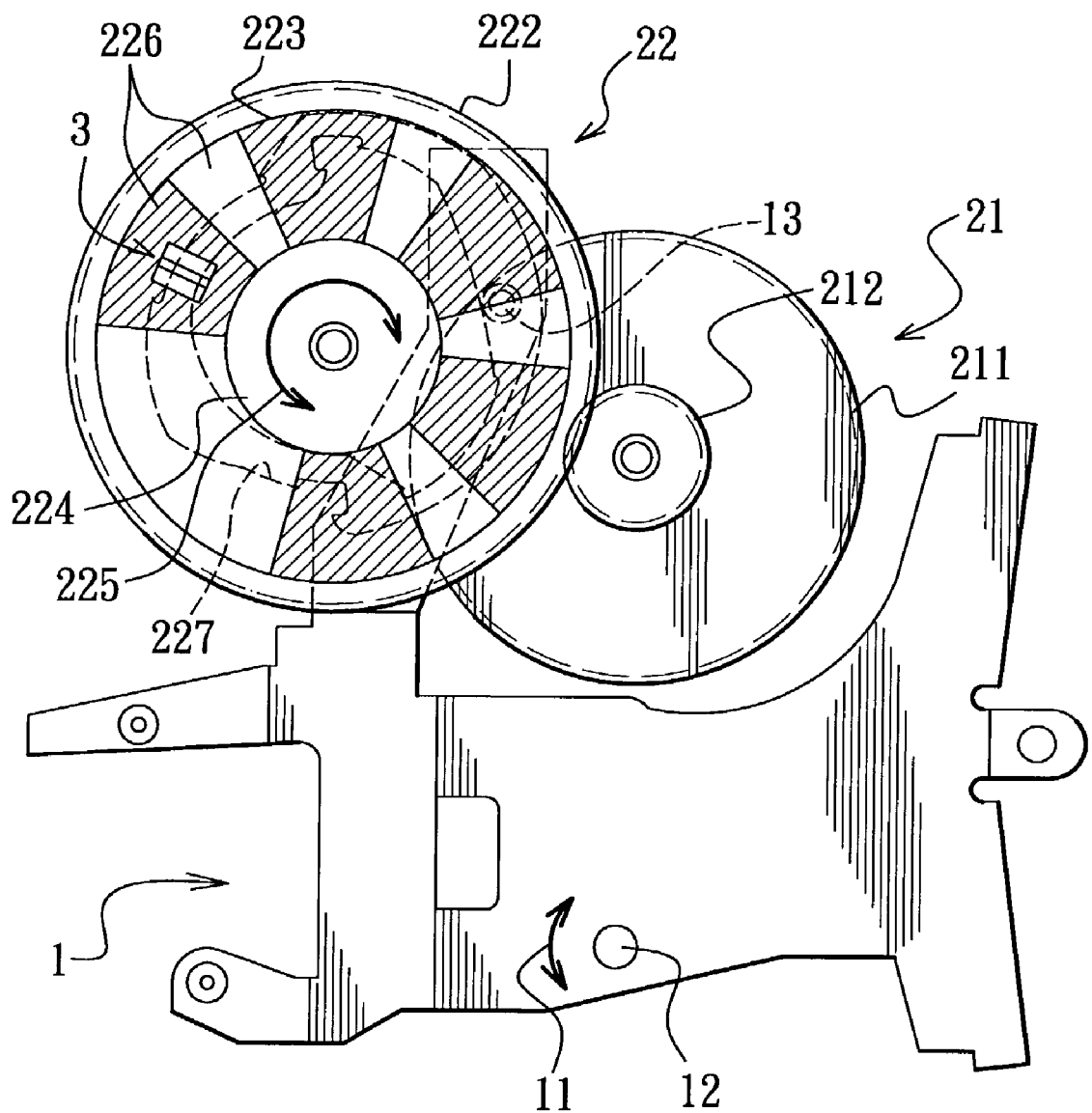
FIG. 4 is a schematic view of the preferred embodiment, a processor thereof being removed for the sake of clarity.
Figure 5:
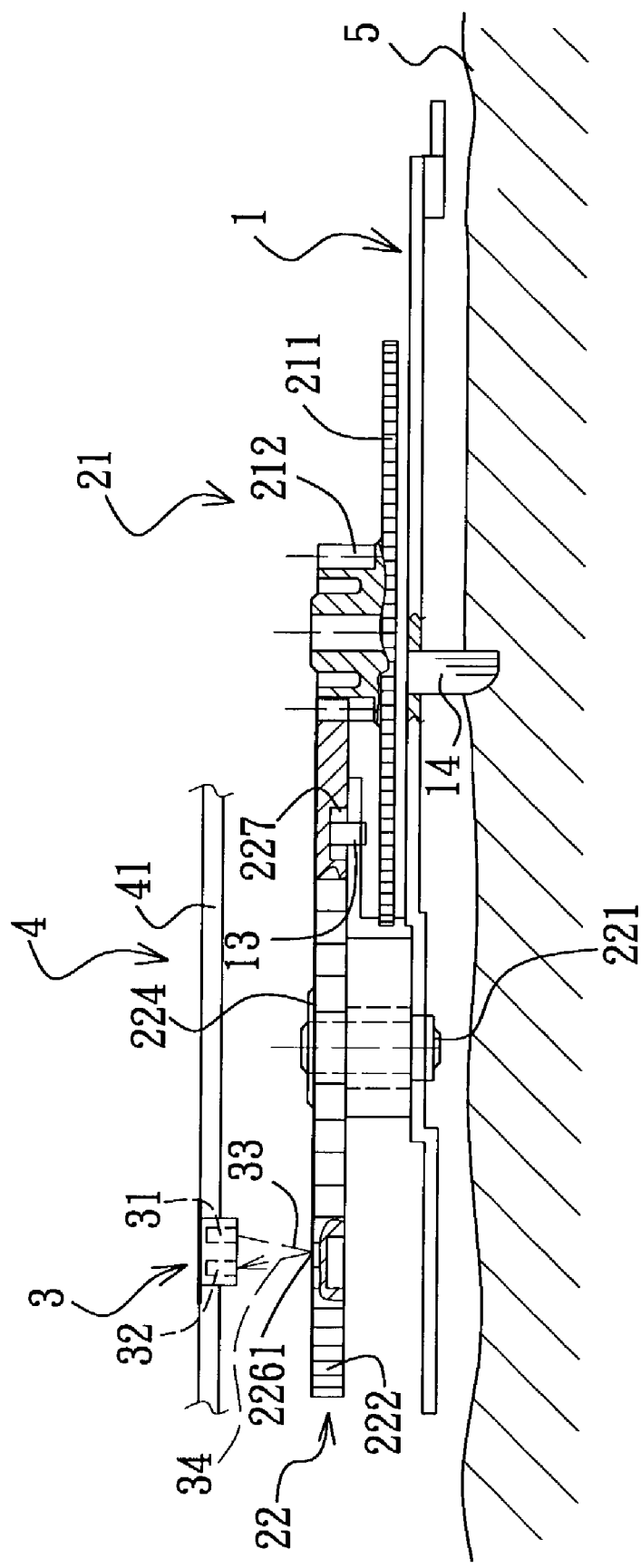
FIG. 5 is a fragmentary side view of the preferred embodiment.

The gear wheel 222 has a second surface which is opposite to the circular thin plate 223 and which is formed with a recess that is confined by a cam edge 227, as best shown in FIG. 3. A follower post 13 is mounted on the driven member 1, and abuts against the cam edge 227 such that the movement of the circular thin plate 223 along the second track 225 results in corresponding movement of the driven member 1 along the first track 11.

The optical unit 3 is disposed adjacent to the circular thin plate 223, and includes a light emitter 31 for emitting a light beam 33 (such as a laser light beam) that is incident upon an aligned reflecting region 2261 (see FIG. 5) on the first surface of the circular thin plate 223 during the movement of the circular thin plate 223 along the second track, and a light receiver 32 for receiving a light beam 34 that was reflected by the aligned reflecting region 2261. The light receiver 32 generates an electrical output corresponding to the light beam 34 received thereby in a known manner.

The controller 4 is coupled electrically to the optical unit 3 and the drive unit 2, and includes a circuit board 41 and a plurality of electronic components (not shown). In this embodiment, the optical unit 3 is mounted on the circuit board 41. The controller 4 has first, second and third look-up information stored therein. The first look-up information defines the relationship between the reflecting regions 226 and the electrical output of the light receiver 32. The second look-up information defines the relationship between the position of the drive member 21 and the position of the driven member 1. The third look-up information defines the relationship between the position of the drive member 21 and the reflecting regions 226.

Thus, with reference to FIG. 6, when the driven member 1 is to be moved to a desired position 110 on the first track 11, a control input corresponding to the desired position 110 of the driven member 1 on the first track 11 is provided to the controller 4 using any appropriate technique. The controller 4 determines an actual position of the drive member 22 on the second track 225 according to the electrical output of the light receiver 32, and further determines an actual position of the driven member 1 on the first track 11 according to the actual position of the drive member 22 on the second track 225. Then, the controller 4 controls the driving member 21 of the drive unit 2 to drive the drive member 22 to move or rotate along the second track 225. The electrical output of the light receiver 32 during the movement of the drive member 22 is received by the controller 4, and is compared with the first look-up information. By referring further to the second and third look-up information, the controller 4 is able to stop movement of the drive member 22 when an aligned reflecting region 2262 corresponding to an intended position 2252 of the drive member 22 is detected. In this state, the drive member 22 and the driven member 1 are positioned at the intended position 2252 and the desired position 110, respectively.

As illustrated, the optical control device according to this invention has a simple and compact construction that can achieve a stable and precise control effect and that utilizes an optical unit 3 and a controller 4 instead of the complicated conventional magnetic clutch control mechanism.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An optical control device for controlling movement of a driven member along a first track, said optical control device comprising:
   a drive unit including a drive member that is disposed to be movable along a second track and that is adapted to be coupled to the driven member for driving the driven member to move along the first track, said drive member having a first surface formed with a plurality of reflecting regions which are disposed along the second track and which have different light reflecting responses to a same light signal;
   an optical unit disposed adjacent to said drive member, said optical unit including a light emitter for emitting a light beam that is incident upon an aligned one of said reflecting regions on said first surface of said drive member during movement of said drive member along the second track, and a light receiver for receiving a light beam that was reflected by said aligned one of said reflecting regions on said first surface of said drive member, said light receiver generating an electrical output corresponding to the light beam received thereby; and
   a controller coupled electrically to said optical unit and said drive unit, said controller determining actual position of said drive member on the second track according to the electrical output of said light receiver and further determining actual position of the driven member on the first track according to the actual position of said drive member on the second track, said controller being adapted to receive a control input corresponding to a desired position of the driven member on the first track, and controlling said drive unit in response to the control input for moving said drive member along the second track so as to dispose the driven member at the desired position on the first track,
   wherein said controller has first, second and third look-up information stored therein,
   said first look-up information defining relationship between said reflecting regions and the electrical output of said light receiver,
   said second look-up information defining relationship between the position of said drive member and the position of the driven member, and
   said third look-up information defining relationship between the position of said drive member and said reflecting regions.

2. The optical control device as claimed in claim 1, wherein the second track is a circular track, and said reflecting regions respectively extend in radial directions from a center of the circular track.

3. The optical control device as claimed in claim 2, wherein said reflecting regions include dark-colored and light-colored reflecting regions that are alternately and angularly disposed on the second track and that have different radial widths.

4. The optical control device as claimed in claim 1, wherein said drive unit further includes a driving member coupled to and driving movement of said drive member along the second track.

5. An optical control device for controlling movement of a driven member along a first track, said optical control device comprising:
   a drive unit including a drive member that is disposed to be movable along a second track and that is adapted to be coupled to the driven member for driving the driven member to move along the first track, said drive member having a first surface formed with a plurality of reflecting regions which are disposed along the second track and which have different light reflecting responses to a same light signal,
   wherein said drive member further has a second surface formed with a cam edge, said drive unit further including a follower post adapted to be mounted on the driven member and abutting against said cam edge such that a movement of said drive member along the second track results in corresponding movement of the driven member along the first track;
   an optical unit disposed adjacent to said drive member, said optical unit including a light emitter for emitting a light beam that is incident upon an aligned one of said reflecting regions on said first surface of said drive member during movement of said drive member along the second track, and a light receiver for receiving a light beam that was reflected by said aligned one of said reflecting regions on said first surface of said drive member, said light receiver generating an electrical output corresponding to the light beam received thereby; and a controller coupled electrically to said optical unit and said drive unit, said controller determining actual position of said drive member on the second track according to the electrical output of said light receiver and further determining actual position of the driven member on the first track according to the actual position of said drive member on the second track, said controller being adapted to receive a control input corresponding to a desired position of the driven member on the first track, and controlling said drive unit in response to the control input for moving said drive member along the second track so as to dispose the driven member at the desired position on the first track.

* * * * *